March 1, 1949.  H. J. DUBNER  2,463,163
PERSPECTIVE INDICATOR
Filed June 13, 1945
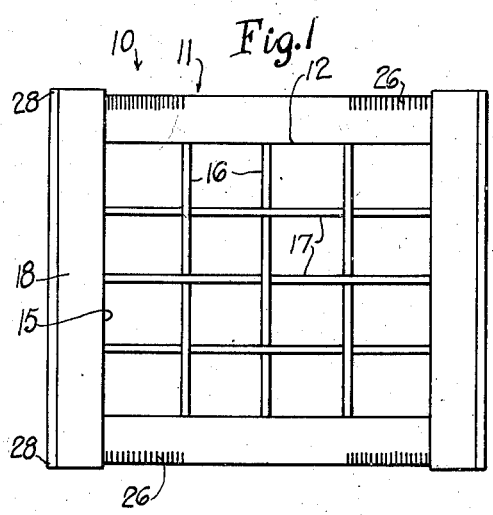
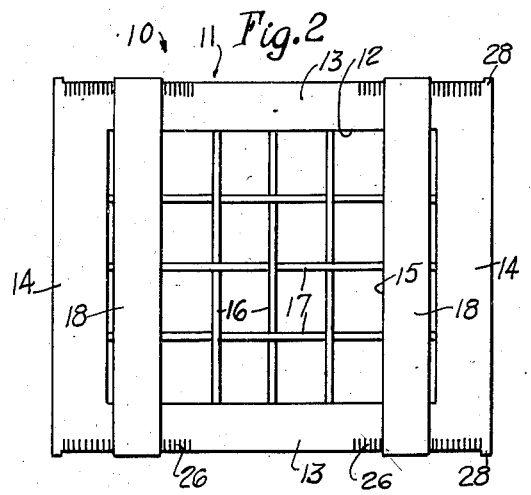
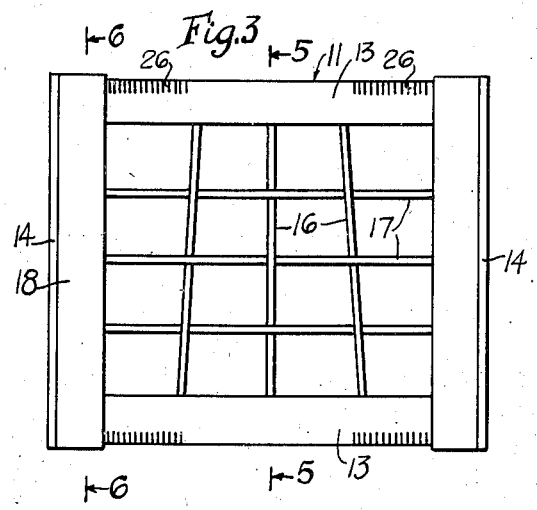
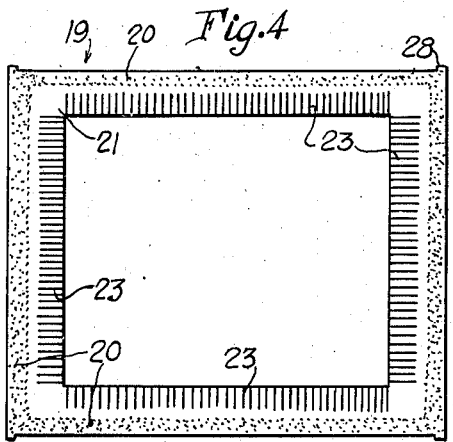
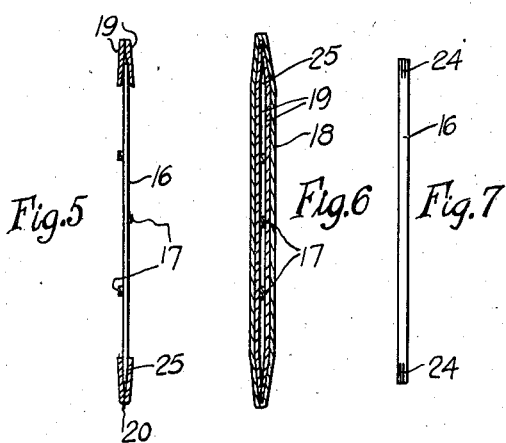
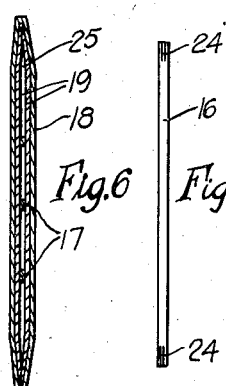
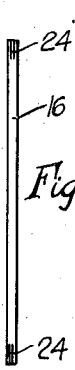
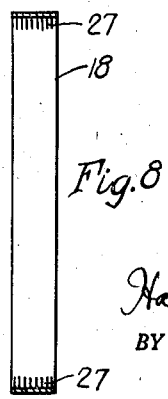
INVENTOR.
Harry J. Dubner
BY *[signature]*, atty.

Patented Mar. 1, 1949

2,463,163

UNITED STATES PATENT OFFICE 2,463,163

PERSPECTIVE INDICATOR

Harry Jay Dubner, Forest Hills, N. Y.

Application June 13, 1945, Serial No. 599,209

8 Claims. (Cl. 35—26)

This invention relates to devices affording assistance in the art of drawing, and has particular reference to such devices which can be used with advantage in making perspective drawings.

Heretofore teachers of perspective drawings have used certain box-types of finders which were useful mainly for confining the scope of the landscape to be drawn. With such finders, it was possible to mark on the edge portions of the finder the location of certain objects lying at the edges of the selected field, but otherwise there was no assistance afforded in locating other objects. Furthermore such a finder gave no assistance in proportioning of the objects in the drawing and of their relative locations, and indicated nothing concerning the angles of the perspective involved; and finally, the finder was not adjustable and hence it was necessary to have finders of different shapes according to the desired field of vision and the general shape of the picture or canvas that was to be produced or worked upon.

It is therefore an object of the invention to provide a device having improved means for avoiding all these difficulties and for attaining all the consequent advantages herein noted.

Another object of the invention is the provision of a relatively small, simple, inexpensive, convenient, durable and compact perspective indicator, which is highly reliable and efficient, and which may be carried in a brief case or even in one's pocket.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a plan view of a perspective indicator embodying the invention, showing the full field of vision.

Fig. 2 is a similar view but showing the perspective indicator adjusted to reduce the field of vision, with the indicator elements correspondingly set.

Fig. 3 is a view like that of Fig. 1 but showing the indicator elements angularly shifted to accord with the angles of the perspectives involved.

Fig. 4 is an inside plan view of one of a pair of like members of which the frame is composed.

Figs. 5 and 6 are sectional views taken respectively on line 5—5 and 6—6 respectively of Fig. 3.

Fig. 7 is a side view of one of the indicator elements.

Fig. 8 is a sectional view of a member for controlling the field of vision, showing the inside face of said member.

The advantages of the invention as here outlined are best realized when all of its features and instrumentalities are combined, but, useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Referring in detail to the drawing, 10 denotes a device such as a perspective indicator, embodying the invention. The same may include a frame 11 which may be square, rectangular or of other suitable form. This frame 11 is formed with a window opening 12 defining a field of vision. This opening 12 is desirably wholly marginally closed as by upper and lower elements 13 and side elements 14 which are interconnected to produce the frame 11.

A plurality of series of vertical indicator elements 16 is provided mounted upon the wall portions 13 of the frame, and a plurality or series of like indicator elements 17 is mounted upon the wall portions 14 of the frame. These different indicator elements extend across the field of vision 15, and intersect each other so as to subdivide the field into openings of like area.

For controlling the area of the field of vision 15 one or more elements 18 are mounted upon the frame 11 so as to be slidable toward each other as shown in Fig. 2. It will thus be seen that not only the area but the shape of the opening 15 may be controlled and caused to harmonize with the object to be viewed and with the shape of the canvas upon which the drawing is to be made.

Upon changing the field of vision 15, it is preferable to correspondingly change the locations of the indicator elements 16 and 17 in order to properly subdivide the resultant field. It will be perceived that the central elements of the indicator 16 and 17 need not be shifted and may be permanently fixed, but certain advantages of the invention are best realized by making all of these elements movable. Provision for suitable movable mountings is made in the manner that will now be described.

Preferably the body or frame 11 consists of two sheet members 19 which are identical with each other in material, form and structure. One of these elements is shown in Fig. 4, and at 20 is indicated an adhesive area or the like along which a pair of the elements 19 are interconnected in a marginally continuous manner, so as to leave the remaining portions of the elements free of each other. Thus there is produced the frame 11 which forms a strong device of double thickness. Between the free portions 21 immediately adjacent the edges of the window opening 15 are inserted the end portions of the indicator elements 16 and 17. The latter are thus retained for adjusting movement, and hence the vertical elements 16 may be moved toward each other as in Fig. 2 without affecting the position of the horizontal elements 17, and similarly certain of the elements 16 may be selectively angularly moved to different positions as shown in Fig. 3.

The members 19 preferably consist of plastic material, autogenously united together at 20 to thus provide at 21 a continuous inner track or a groove which contracts by reason of the stiffness or resilience of the material to thus grip the indicator elements 16 and 17 and to hold them in set position. To permit the indicator elements to be easily shifted to desired positions, they may be made of a material of suitable strength and rigidity, and may consist of very narrow strips of plastic sheeting. Since the resilence of most plastics is rather limited it is preferred to provide an additional frictional means to hold the indicator elements in set position. This is desirably accomplished by roughening or knurling at 23 the inner opposed faces of the members 19, and the indicator elements may also be thus roughened or knurled as shown at 24. For simplicity of illustration, the knurling is indicated as being of the simple parallel line variety, but it may also be of the diamond shaped type to maintain a reliable frictional engagement in angular positions of the indicator elements.

The indicator elements may be assembled with the frame 11 by angularly introducing the end portions thereof into the track or channel 25 above referred to. To provide an additional safeguard against accidental removal of any of these elements from the frame 11, these elements may be arranged according to a woven pattern, as shown in the drawings, thereby mutually reinforcing each other. This arrangement also serves to frictionally retard the indicator elements against accidental displacement from adjusted position and thus supplements the action of the knurled surfaces at 23.

The area control members 18 are preferably made in the nature of loops of an endless type, snugly sleeved around the frame 11. The latter is well adapted to resist any tension caused by these members because of the channel formation of the frame in providing the tracks 25 for the indicator elements. To prevent accidental movement of the members 18 from set position, frictional means may be provided like that previously described. This may include knurled bands or areas 26 on the outer face of each of the members 19, the members 18 being correspondingly knurled as at 27 on their opposed inner faces. The knurling at 26 and 27 thus cooperate to retain the members 18 in set positions as in Figs. 1 and 2. To avoid accidental removal of the members 18 the frame 11 may be provided with integral corner projections 28 to afford lateral abutment to prevent the members 18 from sliding off from the frame. The height of these abutments may be only equal approximately to the thickness of the plastic material of which the members 18 are formed.

In manufacture, large sheets of material may be cemented together along a multitude of lines of rectangular form as shown at 20, and then stamped out to provide a multiplicity of the bodies 11. This assures perfect alinement at the outer edges and consequently a proper fit for accurately receiving the band members 18. Of course those sheets of material will have been previously formed with knurling as at 23 and 26 so that a large number of completely finished frames 11 are thus produced on a quantity production basis. Another sheet of material having long lines or bands of knurling as at 24 is cut into strips of required length to finish the indicator elements 16—17. Finally the band members 18 are made of sheet material having the preformed knurling 27 and cut into suitable strips which are then folded and autogenously united at their ends. Now the frame 11 may be slightly bent to slip these band members 18 over the projections 28. Thus a large number of devices 10 are completed in a simple and expeditious manner.

It will be appreciated that the device 10 may be made of any suitable material and it can be constructed in whole or in part by molding, casting, stamping or rolling. This device may be made as large or as small as desired and may contain any number of the elements 16 and 17, fewer or greater number than shown. Various indicia may be printed or stamped on the sections 13, 14 and 18 of the devices which may be of assistance to the person who is learning to draw. For example, edge portions of the device may indicate half, quarter, eighth, and sixteenth marks and the like.

In use, the operator selects his object as well as the shape of the canvas and the general shape of the picture which he desires to produce. He then moves the band members 18 toward or away from each other to produce a field vision of the desired shape. He then examines the objects in that field which he desires to reproduce and may move the elements 16 and 17 into a suitable gauging relation with those objects, or he merely moves the indicator elements 16 and 17 to subdivide the field division into equal areas. He now ascertains in which subdivision certain objects or parts of objects fall, or determines their relationship to the indicator elements and thus is guided in drawing a picture of the proper scale and proportions throughout. If the object viewed involves various perspective angles, he may move any of the elements 16 and 17 to accord with those angles and thus obtain further assistance in the correct drawing of the perspective. In performing these operations the work of the operator may be expedited by lightly marking out his canvas to correspond to the subdivision areas and to the locations of the elements 16 and 17. It will be appreciated that the most difficult branch of free hand drawing is in the art of making perspectives. By means of the indicator 10, the beginner is encouraged and his faculty of observation is trained. He finds himself more quickly obtaining results which would otherwise be beyond his ability, and rather quickly he discovers that he is able to produce a fairly satisfactory perspective drawing.

It will now be appreciated that I have provided a device which fulfills the several objects of the invention and is well adapted for practical use.

I claim:

1. A perspective indicator including a rectangular frame comprising a plurality of sheet members interconnected along their outer edges, in contact with each other, said frame having a field of vision opening and the sheet members being free of each other adjacent to the edges of the opening to thus provide opposed tracks between the members, long, narrow indicator elements extending across said opening and having end portions inserted in said tracks, said members consisting of a resilient material tending to contract the tracks and snugly engage said indicator elements.

2. A perspective indicator according to claim 1 wherein an inner side face of each track is knurled, to frictionally grip the indicator elements.

3. A perspective indicator according to claim 1 wherein an inner portion of each track and adjacent portions of the elements are provided with frictional portions resisting accidental displacement of the elements.

4. A perspective indicator according to claim 1 wherein the tracks are sufficiently deep and the indicator elements extend sufficiently thereinto to maintain the elements engaged with the tracks upon angular movement of certain of the elements to accord with angular perspective.

5. A perspective indicator according to claim 1 wherein a band member is sleeved around the frame for movement therealong to control the area of the field of vision without interfering with the location of the indicator elements.

6. A perspective indicator according to claim 1 wherein an endless band member is tensioningly sleeved around the frame for controlling the field of vision, the tracks as expanded by the indicator elements serving to stiffen the frame to resist said tension.

7. A perspective indicator according to claim 1 wherein a member is sleeved on the frame for movement therealong to control the field of vision, the control member and the frame having knurled frictional engagement to resist accidental shifting of such member.

8. A perspective indicator according to claim 1 wherein the indicator elements are in movable interwoven relation with each other for mutual reenforcement.

HARRY JAY DUBNER.

REFERENCES CITED

The following references are of record in the file of this patent:

UNITED STATES PATENTS

| Number | Name | Date |
| --- | --- | --- |
| 56,943 | Jackson | Aug. 7, 1866 |
| 761,033 | Cross | May 24, 1904 |
| 1,646,868 | Newlands et al. | Oct. 25, 1927 |
| 1,821,252 | Woods | Sept. 1, 1931 |
| 2,263,101 | Perry | Nov. 18, 1941 |
| 2,350,068 | Scheller | May 30, 1944 |

FOREIGN PATENTS

| Number | Country | Date |
| --- | --- | --- |
| 1,156 | Great Britain | 1902 |
| 23,673 | Great Britain | 1906 |